United States Patent [19]

Cowell et al.

[11] 3,994,987

[45] *Nov. 30, 1976

[54] METAL DEACTIVATORS AS ADHESION PROMOTORS FOR VULCANIZABLE ELASTOMERS TO METALS

[75] Inventors: George K. Cowell, Brunswick, Ohio; David J. Cherry, Somers, N.Y.

[73] Assignee: Ciba-Geigy Corporation, Ardsley, N.Y.

[ * ] Notice: The portion of the term of this patent subsequent to Sept. 23, 1992, has been disclaimed.

[22] Filed: July 30, 1975

[21] Appl. No.: 600,240

Related U.S. Application Data

[62] Division of Ser. No. 404,972, Oct. 10, 1973, Pat. No. 3,907,925.

[52] U.S. Cl. .............................. 260/791; 156/110 A; 156/124; 156/327; 156/328; 260/79.5 R; 260/79.5 P; 428/457; 428/462; 428/465
[51] Int. Cl.² ........................................... B29H 5/02
[58] Field of Search .......... 260/791, 79.5 R, 79.5 P; 156/110 A, 124, 327, 338; 428/457, 462, 465

[56] References Cited
UNITED STATES PATENTS

| | | | |
|---|---|---|---|
| 2,018,645 | 10/1935 | Williams et al. | 260/45.9 R |
| 2,912,355 | 11/1959 | Formanek et al. | 156/110 A |
| 3,110,696 | 11/1963 | Dexter | 260/45.9 NC |
| 3,357,944 | 12/1967 | Dexter | 260/45.9 NC |
| 3,660,438 | 5/1972 | Dexter | 260/45.9 NC |
| 3,734,885 | 5/1973 | Muller et al. | 260/45.9 NC |
| 3,773,830 | 11/1973 | Dexter | 260/45.9 NC |
| 3,907,925 | 9/1975 | Cowell et al. | 260/791 |

*Primary Examiner*—Ronald W. Griffin
*Attorney, Agent, or Firm*—Charles W. Vanecek

[57] ABSTRACT

Adhesion of metals to vulcanizable elastomers is promoted by a process of incorporating into the elastomer a metal deactivator and then vulcanizing the elastomeric composition while it is in contact with the metal surface.

16 Claims, No Drawings

METAL DEACTIVATORS AS ADHESION PROMOTORS FOR VULCANIZABLE ELASTOMERS TO METALS

This is a divisional of application Ser. No. 404,972 filed on Oct. 10, 1973, now U.S. Pat. No. 3,907,925 issued Sept. 23, 1975.

DETAILED DESCRIPTION

This invention relates to the bonding of vulcanizable elastomeric compositions to metals.

In the production of rubber articles, such as, for example, pneumatic tires, belts, conveyor belts provided with reinforcing metallic elements, tubes provided with reinforcing cords or wires, and, in general, in the production of all rubber articles in which rubber is reinforced with metal, it is necessary to obtain between the metal and the elastomeric composition a strong and durable bond in order to ensure a good efficiency and a long life for the articles produced.

It has now been unexpectedly found that unusually good bonds are produced between vulcanizable elastomeric compositions and metals when there is added to the vulcanizable elastomeric composition a compound with metal deactivating activity, and the compositions are then vulcanized while in contact with the metal. Compounds of particular suitability within this broad definition are found to have at least two nitrogen atoms directly bonded to each other, the remaining valence requirements of each nitrogen atom being fulfilled through bonding to hydrogen or to an organic residue. Hydrazine derivatives are thus especially suitable compounds. It appears that the activity of these compounds in adhesion promotion may be attributable in great measure to the N—N atoms. Since the organic residue seems to be of secondary importance, it is felt that this invention may embrace practically all —N—N— containing compounds with metal deactivating efficiency regardless of the specific organic residues involved.

One class of metal deactivating compounds of this invention is represented by the generic formula

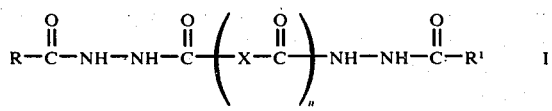

$$\text{R}-\overset{\text{O}}{\underset{\|}{\text{C}}}-\text{NH}-\text{NH}-\overset{\text{O}}{\underset{\|}{\text{C}}}-\left(-\text{X}-\overset{\text{O}}{\underset{\|}{\text{C}}}-\right)_n-\text{NH}-\text{NH}-\overset{\text{O}}{\underset{\|}{\text{C}}}-\text{R}^1 \qquad \text{I}$$

wherein R and R' independently of each other represent alkyl having from 1 to 17 carbon atoms, cyclohexyl, aralkyl which can be substituted by one or two alkyl groups having each from 1 to 4 carbon atoms and/or a hydroxyl group, phenyl, chlorophenyl, dichlorophenyl, phenyl which can be substituted by one or two alkyl groups having each from 1 to 4 carbon atoms and/or a hydroxyl group, alkylphenyl having from 7 to 14 carbon atoms, alkoxyphenyl having from 7 to 24 carbon atoms or naphthyl, X represents the direct bond, an alkylene radical having from 2 to 8 carbon atoms, a phenylene radical or a naphthylene radical, and n represents 0 or 1.

The compounds of formula I are prepared according to procedures described in U.S. Pat. No. 3,734,885.

R and R', respectively, represent in Formula I, e.g., an alkyl group having from 1 to 17 carbon atoms, such as methyl, ethyl, propyl, butyl, pentyl, hexyl, isoheptyl, octyl, decyl, undecyl, dodecyl, tetradecyl, or heptadecyl; or an alkylphenyl group having from 7 to 14 carbon atoms such as, e.g., phenyl which is substituted by methyl, tert.-butyl or tert.-octyl groups; or an alkoxyphenyl group having from 7 to 24 carbon atoms such as, e.g., phenyl which is substituted by methoxy, propoxy, butoxy, hexoxy, octoxy, decyloxy, dodecyloxy, tetradecyloxy or octadecyloxy.

Examples of aralkyl or phenyl radicals represented by R and R', respectively, which radicals can be substituted by one or two alkyl groups having each from 1 to 4 carbon atoms and/or a hydroxyl group are: the 4-hydroxy-2-phenylethyl, 4-hydroxyphenyl, 3-tert.-butyl-4-hydroxy-β-phenylethyl, 3-methyl-4-hydroxyphenyl, 2-hydroxy-3,5-di-tert.-butyl-phenyl and 3,5-di-isopropyl-4-hydroxy-β-phenylethyl radical, more especially, however, the 3,5-di-tert.-butyl-4-hydroxy-β-phenylethyl and 3,5-di-tert.-butyl-4-hydroxyphenyl radical.

When X in Formula I represents an alkylene radical having from 2 to 8 carbon atoms, this can be, e.g., ethylene, propylene, butylene, pentylene, hexylene or octylene. X however can also represent a phenylene radical such as the 1,3- or 1,4-phenylene radical, or a naphthylene radical such as the 2,6- or 1,4-naphthylene radical.

Preferred asymmetrical compounds of Formula I are those wherein R and R' independently of each other represent alkyl having from 1 to 17 carbon atoms, cyclohexyl, benzyl, 3,5-di-tert.-butyl-4-hydroxy-β-phenylethyl, 3,5-di-tert.-butyl-4-hydroxyphenyl, phenyl, chlorophenyl, dichlorophenyl, alkylphenyl having 7 or 8 carbon atoms, alkoxyphenyl having 7 or 8 carbon atoms or naphthyl, and X represents the direct bond.

Preferred symmetrical compounds of Formula I are compounds in which R and R' are identical and each represents alkyl having from 1 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 12 carbon atoms, alkoxyphenyl having from 7 to 12 carbon atoms or naphthyl, and X represents the direct bond.

A second preferred group of symmetrical compounds usable according to the invention are the compounds in which R and R' are identical and each represents alkyl having from 1 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 12 carbon atoms, alkoxyphenyl having from 7 to 12 carbon atoms or naphthyl, and X represents an alkylene radical having from 2 to 8 carbon atoms.

A third preferred group of symmetrical compounds of Formula I are the compounds in which R and R' are identical and each represents alkyl having from 2 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 14 carbon atoms, alkoxyphenyl having from 7 to 18 carbon atoms, or naphthyl, and X represents phenylene or naphthylene.

Illustrative of the compounds of Formula I usable in the present invention are the following compounds:
  N,N'-di-propionyloxalic acid dihydrazide
  N,N'-di-butyroyloxalic acid dihydrazide
  N,N'-di-pelargonyloxalic acid dihydrazide N,N'-di-cyclohexanoyloxalic acid dihydrazide
N,N'-di-phenylacetyloxalic acid dihydrazide
N,N'-di-benzoyloxalic acid dihydrazide
N,N'-di-α-naphthoyloxalic acid dihydrazide
N,N'-di-o-toluoyloxalic acid dihydrazide
N,N'-di-p-methoxybenzoyloxalic acid dihydrazide
N,N'-di-caproyloxalic acid dihydrazide
N,N'-di-capryloyloxalic acid dihydrazide
N,N'-di-acetylsuccinic acid dihydrazide
N,N'-di-actyladipic acid dihydrazide
N,N'-di-propionyladipic acid dihydrazide
N,N'-acecylsebacic acid dihydrazide
N,N'-di-benzoylsebacic acid dihydrazide
N,N'-di-β-naphthoylsebacic acid dihydrazide
N,N'-di-propionylterephthalic acid dihydrazide
N,N'-pelargonylterephthalic acid dihydrazide
N,N'-di-2-ethylhexanoylterephthalic acid dihydrazide
N,N'-di-lauroylterephthalic acid dihydrazide
N,N'-di-stearoylterephthalic acid dihydrazide
N,N'-di-p-(tert.-octyl)-benzoylterephthalic acid dihydrazide
N,N'-di-p-(octoxy)-benzoylterephthalic acid dihydrazide
N,N'-di-tridecanoylterephthalic acid dihydrazide
N,N'-di-palmitoylterephthalic acid dihydrazide
N,N'-di-valeroylterephthalic acid dihydrazide
N,N'-di-butyroylisophthalic acid dihydrazide
N,N'-di-pelargonylisophthalic acid dihydrazide
N,N'-di-cyclohexanoylisophthalic acid dihydrazide
N,N'-di-2-chlorobenzoyloxalic acid dihydrazide
N,N'-bis-2,4-dichlorobenzoylsebacic acid dihydrazide
N-benzoyl-N'-butyroyloxalic acid dihydrazide
N-benzoyl-N'-pelargonyloxalic acid dihydrazide
N,N'-bis-(3,5-di-tert.-butyl-4-hydroxybenzoyl)oxalic acid dihydrazide, and
N,N'-bis-[3-(3,5-di-tert.-butyl-4-hydroxyphenyl)propionyl]-adipic acid dihydrazide.

A second class of metal deactivating compounds of this invention is represented by the generic formula

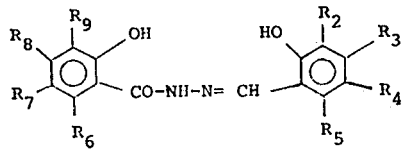

wherein $R_2$, $R_3$, $R_4$, $R_5$, $R_6$, $R_7$, $R_8$ and $R_9$ are each independently hydrogen, alkyl-, especially lower alkyl, e.g., methyl, ethyl, propyl, butyl, pentyl, hexyl-, alkoxy, especially lower alkoxy, e.g., methoxy, ethoxy, propoxy, butoxy, pentoxy, hexoxy-, or a phenyl group.

The preferred compound of the Formula II is N-salicylidene-N'-salicylhydrazide of the Formula III

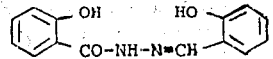 III

In the foregoing Formula II compounds are preferred wherein the R substituents are relatively simple, for example, lower alkyl, lower alkoxy. The R groups may also be halogen e.g., fluorine, chlorine, etc. Where large, bulky substituents such as tertiary alkyl groups occur, it is preferred not to have the same on adjacent carbon atoms of the aromatic ring. The R groups in compounds of the Formula II may be either primary, secondary or tertiary alkyl or alkoxy groups, such as propyl, isopropyl, propoxy, isopropoxy, butyl, isobutyl, tert.butyl, butoxy, isobutoxy, tert.-butoxy, etc.

The compounds of the Formula II at least in part, are known. For example, the compound of the Formula III is a known compound and is prepared according to known methods as described in U.S. Pat. No. 3,110,696.

A third class of metal deactivating compounds of this invention is represented by the generic formula

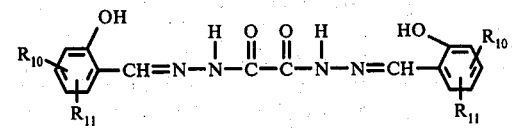 IV in which each of $R_{10}$ and $R_{11}$ is hydrogen, alkyl, chloro, phenyl or, taken together, benzo.

Particularly valuable compounds embraced by Formula IV included compounds of the formula

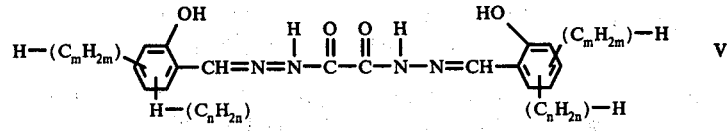 V in which each of $n$ and $m$ is an integer from 0 to 20. Thus included are compounds of the following three formulae:

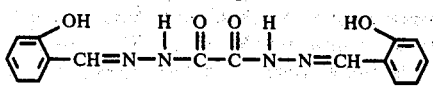 VI

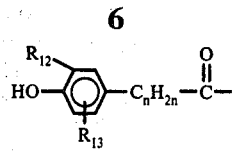

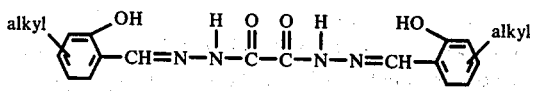 VII

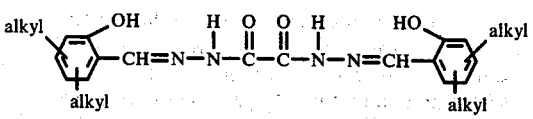 VIII

By the term "alkyl" as used herein is intended a branched or straight chained hydrocarbon containing from one to 20 carbon atoms. Representative of such groups, without being limited thereby, are thus methyl, ethyl, propyl, t-butyl, pentyl, hexyl, octyl, t-octyl, decyl, tetradecyl, octadecyl, eicosyl and the like.

The compounds of Formula IV are prepared according to procedures described in U.S. Pat. No. 3,357,944.

Illustrative of the compounds of Formula IV usable in the present invention are the following compounds:
 oxalo-bis-(2-hydroxy-benzylidene-hydrazide)
 axalo-bis-(2-hydroxy-5-methylbenzylidenehydrazide)
 oxalo-bis-(2-hydroxy-5-t-butylbenzylidenehydrazide)
 oxalo-bis-(2-hydroxy-3,6-dimethylbenzylidenehydrazide)
 oxalo-bis-(2-hydroxy-5-t-amylbenzylidenehydrazide)
 oxalo-bis-(2-hydroxy-3,5-di-t-butylbenzylidenehydrazide)
 oxalo-bis-(2-hydroxy-5-phenylbenzylidenehydrazide)
 oxalo-bis-(2-hydroxy-5-chlorobenzylidenehydrazide)
 oxalo-bis-(2-hydroxy-1-naphthylidenehydrazide.

A fourth class of metal deactivating compounds of this invention is represented by the generic formula:

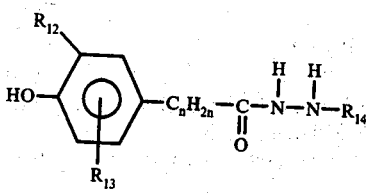 IX wherein $R_{12}$ is a lower alkyl group containing from 1 to 6 carbon atoms, $R_{13}$ is hydrogen or a lower alkyl group containing from 1 to 6 carbon atoms, and $R_{14}$ is hydrogen, an alkanoyl group containing 2 to 18 carbon atoms or a group represented by the formula and $n$ is an integer from 0 to 5.

Illustrative examples of lower alkyl groups that are substituted on the phenyl moiety are methyl, ethyl, propyl, isopropyl, butyl, t-butyl, hexyl and the like. The preferred groups are the tertiary alkyls. Illustrative examples of the higher alkyl groups are heptyl, octyl, decyl, dodecyl, tetradecyl, hexadecyl, octadecyl and the like, both straight chain and branched chain.

The compounds of Formula IX are prepared according to procedures described in U.S. Pat. No. 3,660,438.

Illustrative of the compounds of Formula IX usable in the present invention are the following compounds:
 β-(3,5-di-t-butyl-4-hydroxyphenyl)propionylhydrazide
 N,N'-bis-β-(3,5-di-t-butyl-4-hydroxyphenyl)propionylhydrazine
 N-stearyl-N'-[β-(3,5-di-t-butyl-4-hydroxyphenyl)-propionyl]-hydrazine
 N-[β-(3-ethyl-4-t-butyl-4-hydroxyphenyl)propionyl]-N'-β-(3,5-di-t-butyl-4-hydroxyphenyl)propionyl-hydrazine
 N-[β-(3,5-di-t-butyl-4-hydroxyphenyl)propionyl]-N'-(3,5-di-t-butyl-4-hydroxybenzoyl)-hydrazine
 β-(3,5-diisopropyl-4-hydroxyphenyl)propionylhydrazine
 N-stearoyl-N'-[β-(3,5-diisopropyl-4-hydroxyphenyl)-propionyl]-hydrazine
 N'-octanoyl-N-[β-(3-methyl-5-t-hexyl-4-hydroxyphenyl)-propionyl]-hydrazine.

A fifth class of metal deactivating compounds of this invention is represented by the generic formula

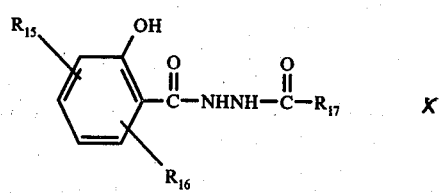 X in which $R_{15}$ denotes hydrogen, alkyl with 1 to 8 carbon atoms, alkenyl with 3 or 4 carbon atoms cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms, $R_{16}$ denotes hydrogen, alkyl with 1 to 5 carbon atoms, alkenyl with 3 or 4 carbon atoms, cyclohexyl, aralkyl with 7 to 9 carbon atoms, chlorine or hydroxyl, $R_{17}$ denotes alkyl with 2 to 21 carbon atoms, cyclohexyl or the radical

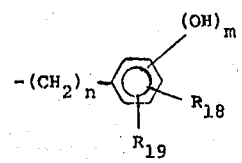

$m$ denotes 0 or 1 and $n$ denotes 0 to 2, the difference $n-m$ being not less than 0 if the OH group is in the o-position to the $-(OH_2)_n$ group, and wherein $R_{18}$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms and $R_{19}$, if $m$ is 1, denotes hydrogen, alkyl with 1 to 5 carbon atoms, alkenyl with 3 or 4 carbon atoms, cyclohexyl, aralkyl with 7 to 9 carbon atoms, chlorine or hydroxyl, or $R_{19}$, if $m$ is 0, denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms.

Preferred compounds of the formula X are those in which $R_{15}$ denotes hydrogen, hydroxyl, chlorine, alkyl with 1 to 8 carbon atoms, alkoxy with 1 to 18 carbon atoms or acetoxy, $R_{16}$ denotes hydrogen, butyl or chlorine and $R_{17}$ denotes alkyl with 3 to 17 carbon atoms, cyclohexyl or the radical

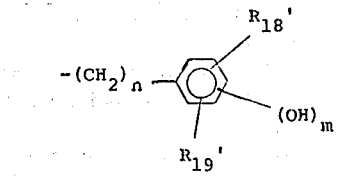

wherein $m$ is 0 or 1, $n$ is 0 to 2 and the difference $n-m$ is not less than 0 if the OH group is in the o-position to the $-(CH_2)_n-$ group, $R_{18}'$ is hydrogen, hydroxyl, chlorine, alkyl with 1 to 4 carbon atoms, or alkoxy with 1 to 16 carbon atoms and $R_{19}'$ is hydrogen, chlorine, alkyl with 1 to 4 carbon atoms, hexadecyloxy, acetylamino or o-hydroxybenzoylamino.

If $R_{15}$, $R_{16}$, $R_{17}$, $R_{18}$ and/or $R_{19}$ represents alkyl groups, these can, within the indicated limits, be methyl, ethyl, propyl, isopropyl, butyl, sec.-butyl, tert.-butyl, amyl, tert.-amyl, sec.-amyl, hexyl, isoheptyl, octyl, tert.-octyl, nonyl, dodecyl, tetradecyl, hexadecyl, octadecyl or eicosyl. If $R_{15}$, $R_{16}$, $R_{18}$ and/or $R_{19}$ are alkenyl groups, these can be allyl or butenyl.

$R_{15}$, $R_{18}$ and/or $R_{19}$ can be cycloalkyl groups with 6 to 8 carbon atoms such as, for example, cyclohexyl, α-methylcyclohexyl or cyclooctyl. If $R_{15}$, $R_{16}$, $R_{18}$ and/or $R_{19}$ are aralkyl groups, they can be benzyl or α-phenylethyl.

If $R_{15}$, $R_{18}$ and/or $R_{19}$ is an alkoxy group with 1 to 18 carbon atoms this can be, for example, methoxy, ethoxy, propoxy, butoxy, hexoxy, octoxy, decyloxy, dodecyloxy, tetradecyloxy, or octadecyloxy. $R_{15}$, $R_{18}$ and/or $R_{19}$ can also be an acyloxy group with 2 to 18 carbon atoms or an acylamino group with 2 to 18 carbon atoms, "acyl" being for example, an acyl radical of the following acids: acetic acid, propionic acid, butyric acid, isobutyric acid, valeric acid, caproic acid, 2-ethylcaproic acid, caprylic acid, capric acid, lauric acid, myristic acid, palmitic acid, stearic acid, acrylic acid, methacrylic acid, crotonic acid, oleic acid, benzoic acid, phenylacetic acid and salicyclic acid.

Compounds of the formula X which are particularly preferred are those in which $R_{15}$ denotes hydrogen, alkyl with 1 to 8 carbon atoms, chlorine or alkoxy with 1 to 8 carbon atoms, $R_{16}$ denotes hydrogen, alkyl with 1 to 5 carbon atoms or chlorine and $R_{17}$ denotes alkyl with 3 to 17 carbon atoms, cyclohexyl, benzyl or one of the radicals

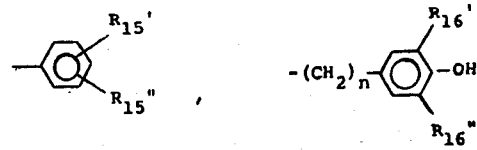

wherein $n$ denotes 0 to 2, $R_{15}'$ and $R_{15}''$ independently of one another denote hydrogen, alkyl with 1 to 8 carbon atoms, chlorine or alkoxy with 1 to 8 carbon atoms, and $R_{16}'$ and $R_{16}''$ independently of one another denote hydrogen, alkyl with 1 to 5 carbon atoms or chlorine.

The compounds of Formula X are prepared according to procedures described in U.S. Patent application Ser. No. 256,969, filed May 25, 1972, now abandoned.

Illustrative of the compounds of Formula X usable in the present invention are the following compounds:
N-salicyloyl-N'-stearoyl-hydrazine
N-(5-tert.-butyl-salicyloyl)-N'-stearoyl-hydrazine
N-salicyloyl-N'-(4-methoxybenzoyl)-hydrazine
N-salicyloyl-N'-(4-tert.-butyl-benzoyl)-hydrazine
N-salicyloyl-N'-(4-acetylaminobenzoyl)-hydrazine
N-salicyloyl-N'-phenylacetyl-hydrazine
N-(5-chlorosalicyloyl)-N'-lauroyl-hydrazine
N-salicyloyl-N'-(4-salicyloylaminobenzoyl)-hydrazine
N-salicyloyl-N'-(3,4-ditert.-butyl-4-hydroxybenzoyl)-hydrazine
N-salicyloyl-N'-2-ethylhexyl-hydrazine
N-salicyloyl-N'-lauroyl-hydrazine
N-salicyloyl-N'-(3,5-di-hexadecyloxybenzoyl)-hydrazine
N-salicyloyl-N'-(3,4-dimethylbenzoyl)-hydrazine
N-(4-octoxysalicyloyl)-N'-stearoyl-hydrazine
N-(4-methoxysalicyloyl)-N'-(4'-methoxybenzoyl)-hydrazine
N-salicyloyl-N'-β(3,5-ditert.-butyl-4-hydroxyphenyl)-propionyl-hydrazine.

A sixth class of metal deactivating compounds of this invention is represented by the generic formula

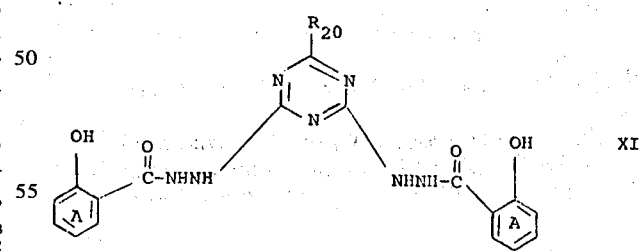

in which $R_{20}$ denotes hydrogen, alkyl with 1 to 8 carbon atoms, alkoxy with 1 to 18 carbon atoms, unsubstituted phenyl, phenyl substituted by lower alkyl groups, lower alkoxy groups, halogen and/or hydroxyl groups, the group

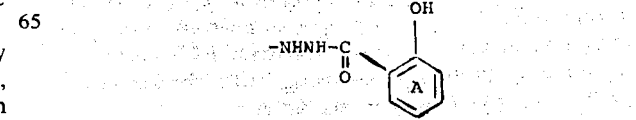

or the group

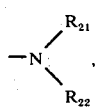

R$_{21}$ and R$_{22}$ independently of one another denote hydrogen, alkyl with 1 to 18 carbon atoms, cyclohexyl, benzyl, unsubstituted phenyl or phenyl substituted by 1 or 2 alkyl groups each having 1 to 8 carbon atoms, or R$_{21}$ and R$_{22}$ conjointly, with inclusion of the nitrogen atom, denote a saturated 5-membered to 7-membered heterocyclic ring, and the rings A are unsubstituted or are substituted by 1 or 2 alkyl groups each having 1 to 18 carbon atoms, an alkoxy group having 1 to 18 carbon atoms and/or 1–3 chlorine atoms.

In formula XI, R$_{20}$ for example, denotes an alkyl group of 1 to 18 carbon atoms, such as methyl, ethyl, propyl, butyl, pentyl, hexyl, octyl, decyl, dodecyl, tetradecyl, hexadecyl or octadecyl, an alkoxy group with 1 to 18 carbon atoms, such as methoxy, propoxy, butoxy, hexoxy, octoxy, decyloxy, dodecyloxy, hexadecyloxy or octadecyloxy, or a phenyl group which can be substituted by lower alkyl, such as methyl, ethyl, propyl or butyl, by lower alkoxy groups, such as methoxy, ethoxy, propoxy, or butoxy, by halogen, such as chlorine or bromine, and by a hydroxyl group, the latter preferably being in the ortho position. In the description, lower alkyl or alkoxy groups denote alkyl or alkoxy groups with 1 to 4 carbon atoms. R$_{20}$ can be unsubstituted, monosubstituted or disubstituted amino group, wherein the substituent or substituents can be unbranched or branched alkyl with 1 to 18 carbon atoms for example methyl, ethyl, propyl, isopropyl, butyl, tert.-butyl, pentyl, hexyl, octyl, tert.-octyl, decyl, dodecyl, tetradecyl, hexadecyl or octadecyl. If R$_{20}$ is a phenyl substituted by 1 or 2 alkyl groups, the alkyl groups contain 1 to 8 carbon atoms and are, for example, methyl, ethyl, propyl, butyl, isobutyl, amyl, hexyl, octyl or isooctyl. R$_{20}$ can also be a five-membered to seven-membered heterocyclic group containing nitrogen in the nucleus, which is bonded via a nitrogen atom to the triazine ring of the compound of the formula XI, for example the piperidine or the morpholine group. The nuclei A in the formula XI can be substituted, for example, by one or two identical or different alkyl groups of 1 to 18 carbon atoms, such as methyl, ethyl, propyl, isopropyl, butyl, tert.-butyl, pentyl, hexyl, octyl, tert.-octyl, decyl, dodecyl, tetradecyl, hexadecyl and octadecyl, or an alkoxy group with 1 to 18 carbon atoms, such as methoxy, propoxy, butoxy, hexoxy, decyloxy, dodecyloxy, hexadecyloxy, or octadecyloxy.

Preferred compounds of the formula XI are those in which R$_{20}$ denotes an alkyl group with 1 to 3 carbon atoms, an alkoxy group with 2 to 4, especially 3 and 4, carbon atoms, or the group

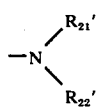

wherein R$_{21}'$ and R$_{22}'$ independently of one another are hydrogen, alkyl with 1 to 8 carbon atoms, cyclohexyl, benzyl, or phenyl, or R$_{21}'$ and R$_{22}'$, with inclusion of the nitrogen atom, form the radical of pyrrolidine, piperidine, morpholine or hexamethyleneimine, and R$_{21}'$ and R$_{22}'$ together contain 1 to 8 carbon atoms, and R$_{20}$ and the substituents of A together contain at most 12 carbon atoms.

Compounds in which R$_{21}'$ and R$_{22}'$ independently of one another denote hydrogen, alkyl with 1 to 8 carbon atoms or phenyl, and R$_{21}'$ and R$_{22}'$ together contain 1 to 8 carbon atoms, are particularly preferred.

Particularly preferred compounds are those in which R$_{21}$ denotes alkyl with 1 or 2 carbon atoms, alkoxy with 1 to 4 carbon atoms, unsubstituted phenyl, phenyl substituted by 1 to 2 methyl groups, chlorine, methoxy or hydroxyl, the group

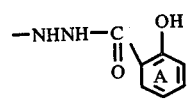

or the group

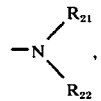

R$_{21}$ and R$_{22}$ independently of one another denote alkyl with 1 to 18 carbon atoms, cyclohexyl, benzyl or phenyl, or R$_{21}$ and R$_{22}$ together, with inclusion of the nitrogen atom, denote a piperidine or morpholine ring, and the rings A are unsubstituted or are substituted by 1 or 2 alkyl groups with 1 to 8 carbon atoms each, an alkoxy group with 1 to 18 carbon atoms, and/or chlorine, with R$_{20}$ and the substituents of A together containing at least 13 carbon atoms.

The compounds of Formula XI are prepared according to procedures described in U.S. Patent application Ser. No. 150,757, filed June 7, 1971, now U.S. Pat. No. 3,850,918, issued June 25, 1975.

Illustrative of the compounds of Formula XI usable in the present invention are the following compounds:

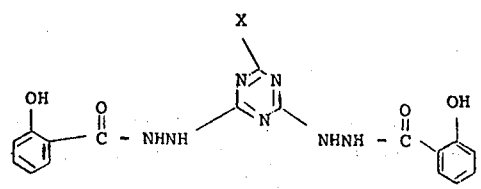

X = —O—CH$_2$—CH$_2$—CH$_3$

—NH—C$_8$H$_{17}$ (u)
—CH$_2$—CH$_2$—CH$_3$

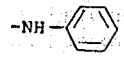

2-(octadecylamino)-4,6-di-salicyloylhydrazine-s-triazine
2-(di-2-ethylhexylamino)-4,6-bis-(2-hydroxy-5-tert.-butylbenzoylhydrazino)-s-triazine
2-(dioctadecylamino)-4,6-bis-(2-hydroxy-5-tert.-octylbenzoyl-hydrazino)-s-triazine
2-dioctadecylamino-4,6-bis-(2-hydroxy-4-octoxybenzoylhydrazino)-s-triazine
2-(di-2-ethylhexyl-amino)-4,6-bis-(2-hydroxy-4-butoxybenzoylhydrazino)-s-triazine
2-di-isopropylamino)-4,6-bis-(2-hydroxy-4-octoxybenzoylhydrazino)-s-triazine
2-propoxy-4,6-bis-(2-hydroxy-4-octoxybenzoylhydrazino)-s-triazine
and compounds of the formula

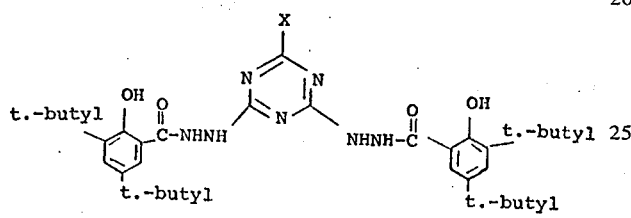

in which X denotes the radicals
—O—CH$_2$—CH$_2$—CH$_3$

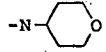

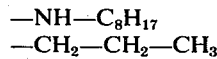

—NH—C$_8$H$_{17}$
—CH$_2$—CH$_2$—CH$_3$

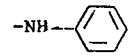

A seventh class of metal deactivating compounds of this invention is represented by the generic formula

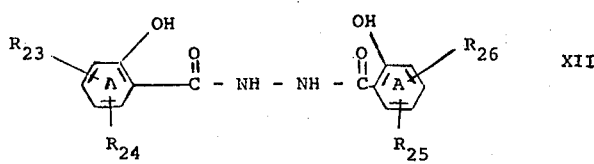

XII in which $R_{23}$, $R_{24}$, $R_{25}$ and $R_{26}$ independently of one another denote hydrogen, alkyl with 1 to 18 carbon atoms, alkenyl with 3 to 4 carbon atoms, cycloalkyl with 6 to 8 carbon atoms, aralkyl with 7 to 9 carbon atoms, alkoxy groups with 1 to 18 carbon atoms, the latter preferably only as substituents $R_{23}$ and $R_{25}$ phenyl and chlorine, and $R_{23}$ and $R_{25}$ independently of one another can additionally also denote hydroxyl, acyloxy with 2 to 18 carbon atoms or acylamino with 2 to 18 carbon atoms.

In the formula XII, $R_{23}$, $R_{24}$, $R_{25}$ and $R_{26}$ for example denote an alkyl group with 1 to 18 carbon atoms, such as methyl, ethyl, propyl, butyl, sec.-butyl, tert.-butyl, n-amyl, sec.-amyl, tert.-amyl, tert.-hexyl, isoheptyl, octyl, isooctyl, tert.-octyl, decyl, undecyl, dodecyl, tert.-dodecyl, tetradecyl or octadecyl, an alkenyl group with 3 to 4 carbon atoms, such as allyl, or butenyl, a cycloalkyl group with 6 to 8 carbon atoms, such as cyclohexyl, or cyclooctyl, an aralkyl group with 7 to 9 carbon atoms, such as benzyl, α-methylbenzyl or α,α-dimethylbenzyl or an alkoxy group with 1 to 18 carbon atoms, such as a methoxy, propoxy, butoxy, octoxy, decyloxy, dodecyloxy, tetradecyloxy or octadecyloxy-group.

The substituents $R_{23}$ and $R_{25}$ denoting acyloxy or acylamino groups with 2 to 18 carbon atoms can be acyl derivatives of carboxylic acids, such as, for example, acetic acid, propionic acid, butyric acid, isobutyric acid, valeric acid, caproix acid, 2-ethylcaproic acid, lauric acid, capric acid, myristic acid, palmitic acid, stearic acid, acrylic acid, methacrylic acid, crotonic acid, isocrotonic acid, oleic acid, benzoic acid and phenylacetic acid.

Amongst the compounds of the formula XII, those are preferred in which $R_{23}$, $R_{24}$, $R_{25}$ and $R_{26}$ independently of one another denote hydrogen, alkyl groups with 1 to 12 carbon atoms, cycloalkyl groups with 6 or 7 carbon atoms, aralkyl groups with 8 or 9 carbon atoms, phenyl, and chlorine and $R_{23}$ and $R_{25}$ independently of one another also denote hydroxyl, alkoxy groups with 1 to 12 carbon atoms, acyloxy groups with 2 to 18 carbon atoms and acylamino groups with 2 to 18 carbon atoms.

Amongst the compounds of the formula XII, those are particularly preferred in which $R_{23}$, $R_{24}$, $R_{25}$ and $R_{26}$ independently of one another denote hydrogen alkyl groups with 1 to 8 carbon atoms, cyclohexyl, α-methylbenzyl, α,α-dimethylbenzyl and chloride and $R_{23}$ and $R_{25}$ independently of one another also denote alkoxy groups with 1 to 12 carbon atoms, or those in which $R_{23}$ and $R_{25}$ independently of one another denote hydrogen, alkyl with 1 to 8 carbon atoms, alkoxy with 1 to 8 carbon atoms, phenyl, hydroxyl, chlorine, α-methylbenzyl, alkanyloxy with 2 to 18 carbon atoms, or alkanoylamino with 2 to 18 carbon atoms, $R_{23}$ can also denote alkoxy with 9 to 17 carbon atoms and $R_{24}$ and $R_{26}$ independently of one another denote hydrogen tert.-butyl or methoxy.

The compounds of Formula XII are prepared according to procedures described in U.S. Patent application Ser. No. 186,393, filed Oct. 4, 1971, now U.S. Pat. No. 3,849,492, issued Nov. 19, 1974.

Illustrative of the compounds of Formula XII usable in the present invention are the following compounds:
N,N'-bis-salicyloyl-hydrazine
N,N'-bis-(2-hydroxy-5-tert.-butylbenzoyl)-hydrazine
N,N'-bis-(2-hydroxy-5-tert.-octylbenzoyl)-hydrazine
N,N'-bis-(2-hydroxy-3,5-di-tert.-butylbenzoyl)-hydrazine
N,N'-bis-(2-hydroxy-5-methylbenzoyl)-hydrazine
N,N'-bis-(2-hydroxy-5-chlorobenzoyl)-hydrazine
N,N'-bis-(2-hydroxy-3,5-dichlorobenzoyl)-hydrazine
N,N'-bis-(2-hydroxy-5-tert.-dodecylbenzoyl)-hydrazine
N,N'-bis-(2-hydroxy-4,5-dimethylbenzoyl)-hydrazine N,N'-bis-(2-hydroxy-5-sec.-butylbenzoyl)-hydrazine
N,N'-bis-(2-hydroxy-5-sec.-octylbenzoyl)-hydrazine
N,N'-bis-(2-hydroxy-5-sec.-nonylbenzoyl)-hydrazine
N,N'-bis-(2-hydroxy-5-cyclohexylbenzoyl)-hydrazine
N,N'-bis-(2-hydroxy-5-cyclooctylbenzoyl)-hydrazine
N,N'-bis-(2-hydroxy-5-α-methylbenzylbenzoyl)-hydrazine
N,N'-bis-(2-hydroxy-4-methoxybenzoyl)-hydrazine
N,N'-bis-(2-hydroxy-4-ethoxybenzoyl)-hydrazine
N,N'-bis-(2-hydroxy-4-butoxybenzoyl)-hydrazine
N,N'-bis-(2-hydroxy-4-dodecylbenzoyl)-hydrazine
N,N'-bis-(2-hydroxy-4-octadecyloxybenzoyl)-hydrazine
N,N'-bis-(2-hydroxy-4-acetoxybenzoyl)-hydrazine
N,N'-bis-(2-hydroxy-4-lauroylbenzoyl)-hydrazine
N,N'-bis-(2-hydroxy-4-stearoyloxybenzoyl)-hydrazine
N,N'-bis-(2-hydroxy-4-octoxybenzoyl)-hydrazine
N,N'-bis-(2-hydroxy-5-octoxybenzoyl)-hydrazine
N-(2-hydroxy-4-octoxybenzoyl)-N'-(2-hydroxy-5-tert.-octylbenzoyl)-hydrazine
N-(2-hydroxybenzoyl)-N'-(2-hydroxy-5-hexadecyloxybenzoyl)-hydrazine
N-(2-hydroxybenzoyl)-N'-(2-hydroxy-5-stearyloxybenzoyl)-hydrazine
N-(2-hydroxybenzoyl)-N'-(2-hydroxy-5-butoxybenzoyl)-hydrazine
N,N'-bis-(2-hydroxy-4-stearyloxybenzoyl)-hydrazine.

An eigth class of metal deactivating compounds of this invention is represented by the generic formula

$R_{27}$—CO—NHNH—CO—$R_{28}$   XIII in which $R_{27}$ and $R_{28}$ independently of one another denote the unsubstituted phenyl group, a phenyl group substituted by a hydroxyl group in the m- or p-position by one or two alkyl groups each with 1 to 4 carbon atoms, by one or two alkenyl groups each with 3 or 4 carbon atoms by one or two cycloalkyl groups each with 6 to 8 carbon atoms, by one or two chlorine atoms, by one or two alkoxy groups each with 1 to 18 carbon atoms, by one or two acyloxy groups each with 2 to 18 carbon atoms, by an acylamino group with 2 to 18 carbon atoms or by an amino group in the o-position, or a pyridyl radical or in which, if $R_{27}$ denotes a substituted phenyl group, $R_{28}$ also denotes hydrogen, alkyl with 1 to 18 carbon atoms, cyclohexyl or benzyl.

It has now been found that the compounds of the formula XIII

$R_{27}$—CO—NHNH—CO—$R_{28}$ in which $R_{27}$ and $R_{28}$ independently of one another denote the unsubstituted phenyl group, a phenyl group substituted by a hydroxyl group in the m- or p-position, by one or two alkyl groups each with 1 to 4 carbon atoms, by one or two alkenyl groups each with 3 or 4 carbon atoms, by one or two cycloalkyl groups each with 6 to 8 carbon atoms, by one or two chlorine atoms, by one or two alkoxy groups each with 1 to 18 carbon atoms, by one or two acyloxy groups each with 2 to 18 carbon atoms, by an acylamino group with 2 to 18 carbon atoms or by an amino group in the o-position, or a pyridyl radical or in which if $R_{27}$ denotes a substituted phenyl group, $R_{28}$ also denotes hydrogen, alkyl with 1 to 18 carbon atoms, cyclohexyl or benzyl.

If $R_{27}$ and $R_{28}$ are phenyl groups substituted by alkyl groups with 1 to 4 carbon atoms each, the alkyl groups can be methyl, ethyl, propyl, iso-propyl, butyl, sec.butyl or tert.butyl. As alkenyl-substituted phenyl groups, $R_{27}$ and $R_{28}$ can, for example, be allylphenyl or butenylphenyl. If the substituents of the phenyl groups $R_{27}$ and $R_{28}$ are cyclohexyl groups each with 6 to 8 carbon atoms, these substituents can be cyclohexyl, α-methylcyclohexyl or cyclooctyl. If $R_{27}$ and $R_{28}$ denote phenyl groups substituted by alkoxy groups each with 1 to 8 carbon atoms, the alkoxy groups can be methoxy, ethoxy, propoxy, iso-propoxy, butoxy, sec.-butoxy, tert.-butoxy, pentoxy, tert.-pentoxy, pentoxy, hexoxy, iso-heptoxy, octoxy or 1,1,3,3-tetramethylbutoxy, undecyloxy, dodecyloxy, hexadecyloxy, or octadecyloxy. $R_{27}$ and $R_{28}$ can also be phenyl radicals substituted by acyloxy or acylamino groups, each with 2 to 18 carbon atoms, in which case "acyl" can be, for example, the acyl radical of the following acids; acetic acid, propionic acid, butyric acid, isobutyric acid, valeric acid, caproic acid, 2-ethylcaproic acid, caprylic acid, capric acid, lauric acid, myristic acid, palmitic acid, stearic acid, benzoic acid or phenylacetic acid. The preferred acyl radical is the radical of the benzoic acid. If $R_{27}$ denotes a substituted phenyl groups, $R_{28}$ can also be an alkyl group with 1 to 18 carbon atoms such as methyl, ethyl, propyl, butyl, pentyl, hexyl, iso-heptyl, octyl, nonyl, undecyl, dodecyl, tetradecyl, hexadecyl or octadecyl.

The preferred compounds of the formula XIII are those in which $R_{27}$ and $R_{28}$ independently of one another denote a phenyl group which is substituted by a hydroxyl group in the m- or p- position, by one or two alkoxy groups each with 1 to 18, and particularly preferentially 1 to 16, carbon atoms, by an acylamino group with 2 to 7 carbon atoms, or by an amino group in the o-position or in which, if $R_{27}$ represents an acylaminophenyl group with 2 to 7 carbon atoms, in the acyl radical, $R_{28}$ also denotes alkyl with 1 to 8 carbon atoms and particularly preferentially methyl, benzyl or phenyl.

The compounds of Formula XIII are prepared according to procedures described in U.S. Patent application Ser. No. 307,269, filed Nov. 16, 1972.

Illustrative of the compounds of Formula XIII usable in the present invention are the following compounds:
N,N'-bis-(3,5-dimethoxybenzoyl)-hydrazine
N,N'-bis-(4-octyloxybenzoyl)-hydrazine
N-(4-benzoylaminobenzoyl)-N'-benzoyl-hydrazine
N-(4-acetylaminobenzoyl)-N'-acetyl-hydrazine
N,N'-bis-(2-aminobenzoyl)-hydrazine.

A ninth class of metal deactivating compounds of this invention is represented by the generic formula

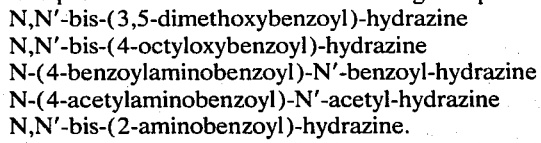

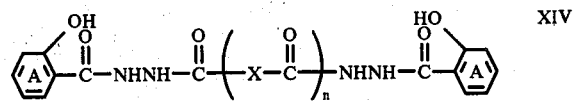

in which X denotes a direct bond, an alkylene radical with 1 to 8 carbon atoms, a phenylene radical or a naphthylene radical and $n$ denotes 0 or 1, and the rings A are unsubstituted or one ring A or both rings A are substituted by alkyl groups, alkenyl groups, cycloalkyl groups, aralkyl groups, further hydroxyl groups, alkoxy groups, acyloxy groups, acylamino groups, or halogen, preferably by 1 or 2 alkyl groups with 1 to 18 carbon atoms, 1 or 2 alkenyl groups with 3 to 4 carbon atoms, 1 or 2 cycloalkyl groups with 6 to 8 carbon atoms, 1 or 2 benzyl groups, 1 or 2 α-methylbenzyl groups, a further hydroxyl group, an alkoxy group with 1 to 18 carbon atoms, an acyloxy group with 2 to 18 or an acylamino group with 2 to 18 carbon atoms, and 1 or 2 chlorine atoms.

X in the formula XIV can, for example, be an alkylene radical with 1 to 8 carbon atoms, such as methylene, ethylene, propylene, butylene, trimethylbutylene, pentylene, hexylene or octylene. It can also denote a phenylene radical, such as the 1,3- or 1,4-phenylene radical, or a naphthylene radical, such as the 2,6- or 1,4-naphthylene radical. The rings A can each be substituted by 1 or 2 alkyl groups with, preferably, 1 to 8 carbon atoms, such as, for example, methyl, ethyl, propyl, iso-propyl, butyl, sec.-butyl, tert.-butyl, amyl, tert.-amyl, sec.-amyl, hexyl, iso-heptyl, octyl, tert.-octyl, sec.-nonyl and dodecyl. The rings A can also each be substituted by 1 or 2 alkenyl groups with, preferably, 3 or 4 carbon atoms, such as, for example, allyl or butenyl, or 1 or 2 cycloalkyl groups with preferably 6 to 8 carbon atoms, such as, for example, cyclohexyl, α-methylcyclohexyl or cyclooctyl. If the substituent of the rings A is an alkoxy group with, preferably 1 to 18 carbon atoms, this group can, for example, be methoxy, ethoxy, propoxy, butoxy, hexoxy, octoxy, decyloxy, dodecyloxy, tetradecyloxy or octadecyloxy. The rings A can furthermore each be substituted by an acyloxy group, preferably with 2 to 18 carbon atoms, or an acylamino group, preferably with 2 to 18 carbon atoms and the acyl radicals of the following acids, for example, can be involved: acetic acid, propionic acid, butyric acid, isobutyric acid, valeric acid, caproic acid, 2-ethylcaproic acid, caprylic acid, capric acid, lauric acid, myristic acid, palmitic acid, stearic acid, acrylic acid, methacrylic acid, crotonic acid, oleic acid, benzoic acid and phenylacetic acid.

The compounds of the formula XIV in which X denotes the direct bond, an alkylene radical with 3 to 8 carbon atoms, a phenylene radical or a naphthylene radical and $n$ denotes 0 or 1 and the rings A can be unsubstituted or each substituted by 1 or 2 alkyl groups with 1 to 8 carbon atoms, an alkoxy group with 1 to 18 carbon atoms or chlorine, are particularly preferred.

Those compounds of the formula XIV are particularly preferred, in which X denotes an alkylene radical with 3 to 8 carbon atoms and $n$ denotes 0 or 1 and the rings A are unsubstituted or in which X denotes the direct bond and $n$ denotes 1 and the rings A are each substituted by 1 or 2 alkyl groups with 1 to 8 carbon atoms and/or an alkoxy group with 1 to 8 carbon atoms.

The compounds of Formula XIV are prepared according to procedures described in U.S. Patent application Ser. No. 170,379, filed Aug. 9, 1971, now abandoned.

Illustrative of the compounds of Formula XIV usable in the present invention are the following compounds:
N,N′-bis-salicyloyl-oxalic acid dihydrazide
N,N′-bis-(2-hydroxy-5-tert.butyl-benzoyl)-oxalic acid dihydrazide
N,N′-bis-(2-hydroxy-4-octoxy-benzoyl)-oxalic acid dihydrazide
N,N′-bis-salicyloyl-adipic acid dihydrazide
N,N′-bis-salicyloyl-sebacid acid dihydrazide
N,N′-bis-(2-hydroxy-3,5-di-tert.butyl-benzoyl)-adipic acid dihydrazide
N,N′-bis-(2-hydroxy-3,5-di-tert.butyl-benzoyl)-terephthalic acid dihydrazide
N,N′-bis-(2-hydroxy-5-tert.butyl-benzoyl)-terephthalic acid dihydrazide
N,N′-bis-(2-hydroxy-4-methoxybenzoyl)-sebacic acid dihydrazide
N,N′-bis-(2-hydroxy-4-octoxybenzoyl)-oxalic acid dihydrazide
N,N′-bis-(2-hydroxy-4-octoxybenzoyl)-sebacic acid dihydrazide
N,N′-bis-(2-hydroxy-3,5-di-tert.butyl-benzoyl)-oxalic acid dihydrazide
N,N′-bis-(2-hydroxy-4-methoxy-benzoyl)-oxalic acid dihydrazide
N,N′-bis-(2-hydroxy-4-methoxy-benzoyl)-trimethyladipic acid dihydrazide.

A tenth class of metal deactivating compounds of this invention is represented by the generic formula

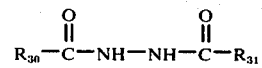

$$R_{30}-\overset{O}{\underset{\|}{C}}-NH-NH-\overset{O}{\underset{\|}{C}}-R_{31} \qquad XV$$

wherein $R_{30}$ and $R_{31}$ independently of one another are alkyl of from 1 to 17 carbon atoms. Compounds of Formula XV can be prepared by methods well known in the art.

In addition to the classes of compounds presented above, the N-N containing compounds disclosed in the following patents can also be employed as the adhesion promoting compound of the invention and the disclosures contained in these patents are incorporated herein.

U.S. Pat. No. 3,549,572
U.S. Pat. No. 3,673,152
U.S. Pat. No. 3,560,434
U.S. Pat. No. 3,629,189
German Offenlegungsschrift 2164234
German Offenlegungsschrift 2164635
German Offenlegungsschrift 1926547
German Offenlegungsschrift 1927447

According to the present invention therefore, there is provided a method of bonding a vulcanizable elastomeric composition to a metal surface during vulcanization which comprises adding to a vulcanizable elastomeric composition a metal deactivating compound as previously defined in an amount of from 0.05 phr to 10 phr by weight based on the weight of the elastomer, and preferably from 0.1 to 5.0 phr, and vulcanizing the composition while it is in contact with the metal surface to provide a strong and durable bond. There is further provided a product of the method described in this paragraph.

According to the present invention, there is also provided a composition which comprises vulcanizable elastomer, a vulcanizing agent, and a metal deactivating compound as previously defined in an amount of from 0.05 phr to 10 phr by weight based on the weight of the elastomer, and preferably from 0.10 to 5.0 phr.

The vulcanizable elastomeric composition may be produced by mixing the ingredients of the composition in the normal manner in an internal mixer, for example, an extruder, a Banbury mixer and/or on a two-roll mill. After mixing, the composition may be applied to a metal surface and vulcanized. After application to the metal surface, the composition is normally vulcanized at a temperature of from 140° C to 180° C. The time of vulcanization may be varied according to the vulcanization temperature and the properties desired in the vulcanizate, as is known in the art.

The additives of this invention can be used with any vulcanizable elastomer. All natural and/or synthetic rubbers are usable in the present invention. Such elastomers include polydienes such as polybutadiene or polyisoprene, including natural rubber; copolymers of dienes such as butadiene or isoprene with other copolymerizable monomers such as styrene, alpha-methylstyrene, an acrylic ester, methylisopropenylketone, isobutylene, acrylonitrile or an unsaturated carboxylic acid; halogenated rubbers such as polychloroprene or fluororubbers; interpolymers of one or more monoolefins with a monomer which confers unsaturation on the interpolymer, for example, an unsaturated ethylene-/propylene interpolymer such as an ethylene-/propylene/dicyclopentadiene terpolymer; sulphur-vulcanizable polyurethane rubbers; butyl rubber containing at least 0.8% unsaturation; and combinations of the above elastomers, e.g., natural rubber/butadiene-styrene copolymer blends, a mixture of a saturated copolymer of ethylene and propylene with an unsaturated interpolymer of ethylene, propylene and a monomer comprising unsaturation in the interpolymer, etc.

In addition to the metal deactivating compounds previously defined, the compositions of this invention may contain other conventional additives including accelerators, activators, anti-cracking agents, antioxidants, antiozonants, anti-scorching agents, antistatic agents, dispersing agents, extruders, fillers, internal lubricants, plasticizers and softeners, processing aids, retarders, tackifiers, vulcanizing agents, pigments, etc. These conventional ingredients and additives are added to the elastomeric material in suitable amounts in known manners to produce a vulcanizable composition based on the selected elastomer.

The vulcanizable compositions which may be bonded by the method of the present invention will preferably contain carbon black. The amount of carbon black included will depend upon the desired nature of the product, since although the hardness is increased by increased amounts of carbon black, the resilience of the rubber, when vulcanized, is reduced. Preferably, however, the amount of carbon black in the rubber is from 25 to 80 parts by weight of carbon black per 100 parts by weight of the elastomer in the compositions.

The use of sulphur as vulcanizing agent is preferred, since this ingredient is known to be capable of facilitating the bonding between the elastomeric composition and metals, and in particular, brass or zinc plated metals. The amount of sulphur in the synthetic rubber composition may be from 0.1 to 25 parts by weight, preferably from 0.5 to 10 parts by weight, per 100 parts by weight of the vulcanizable elastomer.

Examples of accelerators useful in the invention are mercaptobenzothiazole or N-cyclohexylbenzothiazole-2-sulphenamide which may be present in an amount of, for example, from 0.1 to 6.0 parts by weight per 100 parts by weight of the elastomer.

The metals to which the elastomeric composition is to be bonded include iron, steel, cobalt, nickel, copper, zinc, titanium, vanadium, chromium, tin and mixtures of the above, more specifically brass and bronze. The preferred metals of this invention are steel or brass, bronze or zinc plated metals. It is not necessary for the surface of the metal to be roughened before the composition is applied since the bond between the composition and the metal is not a mechanical one. However, it is preferred to free the metal surface of grease and dirt before the composition is applied.

The following examples, presented for illustration and not limitation, will further serve to typify the nature of the present invention.

EXAMPLE 1

Bonding of Natural Rubber to Brass Plated Steel Wire a. Preparation of Natural Rubber Stock One hundred parts of natural rubber (SMR5L) were placed in a size B Banbury Mixer preheated to about 110° F and having a rotor speed of 116 rpm. After 0.5 minutes of mixing, 1.00 part stearic acid plus 5.00 parts of tackifier (Piccovar 420) were added. After mixing for an additional minute, 50.00 parts of carbon black (Continex FEF (N-550)) were added in two equal portions. The two portions were added after 1.5 and 2.5 minutes of total mixing time. Zinc oxide, 1.00 part, was added after 3.5 minutes of total mixing time and the mix was swept down after 4.5 minutes of total mixing time. After mixing for an additional 1.5 minutes to make a total of 6 minutes, the entire mix was dumped at a temperature of about 320° F.

b. Sample Preparation

The stock obtained after Banbury mixing was cut into smaller samples, ranging in size from 50 to 100 grams, which were subsequently milled on a two-roll mill at 160° F for seven minutes, during which time 2.00 parts of sulfur, 0.75 part accelerator (SANTOCURE NS) and 1.60 parts of the additive compound were added. After 7 minutes of milling, the stock was sheeted.

The sheeted stock was cut into 0.5 × 8.0 inch strips and stacked to form two strips each weighing approximately 16 grams. The strips were freshened (lightly washed) with n-hexane prior to being placed in a curing mold.

The mold was preheated in a hydraulic compression press maintained at 290° F for a minimum of three minutes. The mold was removed from the press, and loaded according to the following sequence: brass support plate (8 × 0.5 × 0.062 inch), rubber strip, brass plated steel wire sample, rubber strip, brass support plate and top plate of mold. The sample was cured for 23 minutes at 290° F under a ram force of 23,000 pounds. After the 23 minute curing time, the mold was removed from the press and the rubber sample containing both the support plates and wire was removed from the mold and allowed to cool to ambient temperature (~72° F).

A description of the above sample preparation procedure is found in ASTM Test D2229-68.

c. Testing Method

After standing at ambient temperature for 18 to 24 hours, the wires were pulled from the rubber stock using an Instron Testing machine, in accordance with the testing procedure set forth in ASTM test 2229-68, but with the modifications described in A. E. Hicks et al. in *Rubber Chemistry and Technology*, 45, 26–48 (1972).

d. Test Results

The test results reported below were obtained according to the procedures described above. Pull-Out Force in the Table is the average force required to pull the wire from 0.5 inches of rubber. The blank value is the average force required to pull the wire from a formulation containing all of the ingredients except the additive compound. All formulations with the same stock designation number were prepared from the same rubber stock.

about 70° F and having a rotor speed of 116 rpm. After mixing for 0.5 minutes, 2.82 parts of zinc oxide and 0.71 parts of Age-Rite Resin D (antioxidant) were added and mixed for another minute. Stearic acid, 0.71 part, was then added and mixed for an additional 2.5 minutes, then swept down and the mixing continued for 2 more minutes for a total mixing time of 6 minutes, at which time the entire mix was dumped at a temperature of about 345° F.

TABLE I

Adhesion of Natural Rubber to Brass Plated Steel Wire

| Additive Compound | Stock Designation | Pull-Out Force (lbs./0.5 in.) |
|---|---|---|
| 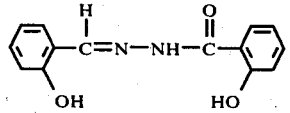 | 1 | 28.5 |
| Blank | 1 | 16.4 |
| 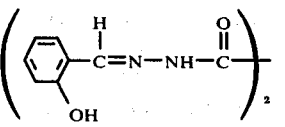 | 2 | 30.4 |
| Blank | 2 | 20.3 |
| 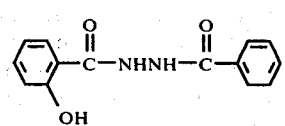 | 3 | 35 |
| 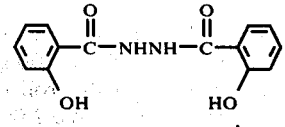 | 3 | 42 |
| 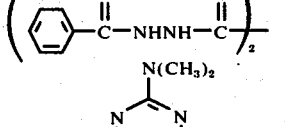 | 3 | 41 |
| 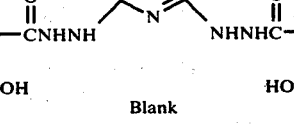 | 3 | 31 |
| Blank | 3 | 29 |
| 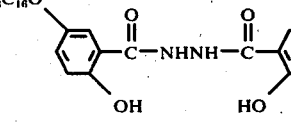 | 4 | 26 |
| 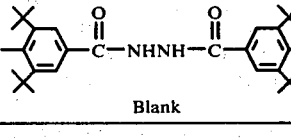 | 4 | 28 |
| Blank | 4 | 20 |

EXAMPLE 2

Bonding of Styrene-Butadiene Copolymer to Brass Plated Steel Wire a. Preparation of Styrene-Butadiene Copolymer Stock One hundred and fifty parts of a SBR Master-batch No. 1605 (Ashland Chemical) containing 100.00 parts SBR and 50.00 parts carbon black FEF (N-550) were placed in a size B Banbury Mixer, initially heated to b. Sample Preparation The stock obtained after Banbury mixing was cut into smaller samples, ranging in size from 50 to 100 grams. These were subsequently milled on a two roll mill at 180° F for 7 minutes during which time 1.24 parts of sulfur, 0.64 part of Santocure NS, 0.14 parts of tetramethylthiuram monosulfide and either 1.00 part or 1.60 of the additive compound were added. After 7 minutes of milling, the stock was sheeted.

The sheeted stock was cut into 0.5 × 8.0 inch strips and stacked to form two strips each weighing approximately 16 grams. The strips were freshened (lightly washed) with n-hexane prior to being placed in the curing mold.

The mold was preheated in a hydraulic compression press maintained at 300° F for a minimum of 3 minutes. The mold was removed from the press and loaded according to the following sequence: brass support plate (8 × 0.5 × 0.062 inch), rubber strip, brass plated steel wire samples, rubber strip, brass support plate and top plate of mold. The sample was cured for 24 minutes at 300° F under a ram force of 23,000 pounds. After the 24 minutes curing time, the mold was removed from the press and the rubber sample containing both the support plates and wires were removed from the mold and allowed to cool to ambient temperature (~72° F).

A description of the above sample preparation procedure is found in ASTM Test D2229-68.

c. Test Method

After standing at ambient temperature for 18 to 24 hours, the wires were pulled from the rubber stock using an Instron Testing machine according to ASTM Test 2229-68 but including the modifications described by A.E. Hicks et al. in *Rubber Chemistry and Technology*, 45, 26–48 (1972).

d. Test Results

The test results reported below were obtained according to the procedures described above. Pull-Out Force in the Table is the average force required to pull the wire from 0.5 inches of rubber. The blank value is the average force required to pull the wire from a formulation containing all of the ingredients except the additive compound. All formulations with the same stock designation number were prepared from the same rubber stock.

polymer) in a size B Banbury Mixer preheated to about 120° F and having a rotor speed of 116 rpm. After mixing for 0.5 minute, 1.00 part of stearic acid was added and mixed for another 0.5 minute. One-half of 150.00 parts of carbon black FEF (N-550) was then added and mixed for an additional 0.5 minute. Then the remaining one-half of the carbon black, 5.00 parts of zinc oxide and 100.00 parts of process oil (Flexon 580) were added, the stock was mixed for another 4.5 minutes and then dumped. The total mixing time was 6 minutes and the dump temperature was about 335° F.

b. Sample Preparation

The Banbury mixed stock was cut into smaller samples, ranging in size from 50 to 100 grams. These were milled on a two roll mill at 180° F for 7 minutes during which time 1.50 parts of sulfur, 1.50 parts of tetramethylthiuram monosulfide, 0.50 part mercaptobenzothiazole and either 1.00 part or 1.60 parts of the additive compound were added. After 7 minutes of milling, the stock was sheeted.

The sheeted stock was cut into 0.5 × 8.0 inch strips and stacked to form two strips each weighing about 16 grams. The strips were freshened (lightly washed) with n-hexane prior to being placed in the curing mold.

The mold was preheated in a hydraulic compression press maintained at 300° F for a minimum of 3 minutes. The mold was removed from the press and loaded according to the following sequence: brass support plate (8 × 0.5 × 0.062 inch), rubber strip, brass plated steel wire samples, rubber strip, brass support plate and top plate of mold. The sample was cured for 32 minutes at 300° F under a ram force of 23,000 pounds. After the 32 minutes curing time, the mold was removed from the press and the rubber sample containing both the support plates and wires was removed from the mold and allowed to cool to ambient temperature (~72° F).

TABLE II

| Additive Compound | Adhesion of SBR to Brass Plated Steel Wire Concentration phr | Stock Designation | Pull-Out Force (lbs./0.5 in.) |
|---|---|---|---|
| Ph(OH)–CH=N–NH–C(=O)–Ph(OH) | 1.00 | 1 | 33.9 |
| Ph(OH)–CH=N–NH–C(=O)–Ph(OH) | 1.60 | 1 | 42.6 |
| Blank | | 1 | 16.6 |
| [H₃₅C₁₇–C(=O)–NHNHC(=O)–]₂ | 1.00 | 2 | 24 |
| Blank | | 2 | 17 |

EXAMPLE 3

Bonding of Ethylene-Propylene Terpolymer (EPDM) Rubber to Brass Plated Steel Wire a. Preparation of EPDM Rubber Stock The EPDM Rubber Stock was prepared by placing 100.00 parts of EPDM rubber (EPSYN 40A from Co- A description of the above sample preparation procedure is found in ASTM Test D2229-68.

c. Test Method

After standing at ambient temperature for 18 to 24 hours, the wires were pulled from the rubber stock using an Instron Testing machine according to ASTM Test 2229-68, but including the modifications described by A. E. Hicks et al. in *Rubber Chemistry and Technology*, 45, 26–48 (1972).

d. Test Results

The test results reported below were obtained according to the procedures described above. Pull-Out Force in the Table is the average force required to pull the wire from 0.5 inches of rubber. The blank value is the average force required to pull the wire from a formulation containing all of the ingredients except the additive compound. All formulations with the same stock designation number were prepared from the same rubber stock.

Tellurac and 1.00 part MBT (Thiofide) were added. After 8 minutes of milling, the stock was sheeted.

The sheeted stock was cut into 0.5 × 8.0 inch strips and stacked to form two strips each weighing about 16 grams. The strips were freshened (lightly washed) with n-hexane prior to being placed in the curing mold.

The mold was preheated in a hydraulic compression press maintained at 316° F for a minimum of 3 minutes. The mold was removed from the press and loaded according to the following sequence: brass support plate (8 × 0.5 × 0.062 inch), rubber strip, wiere samples, rubber strip, brass support plate and top plate of mold.

TABLE III

Adhesion of EPDM Rubber to Brass Plated Steel Wire

| Additive Compound | Concentration phr | Stock Designation | Pull-Out Force (lbs./0.5 in.) |
|---|---|---|---|
| [structure: C=N-NH-C with OH, HO substituents] | 1.00 | 1 | 16.0 |
| [same structure] | 1.60 | 1 | 15.8 |
| blank | | 1 | 3.2 |
| [structure: H₃₅C₁₇—C(O)—NHNH—C(O)—]₂ | 1.00 | 2 | 7 |
| blank | | 2 | 3 |

EXAMPLE 4

Bonding of Butyl Rubber to Brass Plated Steel Wire a. Preparation of Butyl Rubber Stock The Butyl Rubber stock was prepared by placing 100.00 parts of butyl rubber (ENJAY 365) and 1.00 part of stearic acid in a size B Banbury Mixer at room temperature (72° F) and having a rotor speed of 155 rpm. After mixing for 0.5 minutes, one-half of 50.00 parts of carbon black FEF (N-550) was added and mixed for another 3 minutes. The remaining one-half of the carbon black, together with 5.00 parts of zinc oxide were added and then mixed for another 3 minutes. The mix was swept down, mixed for 2 more minutes and then dumped after a total mixing time of 8.5 minutes, at a temperature of about 340° F.

b. Sample Preparation

The Banbury mixed stock was cut into smaller samples, ranging in size from 50 to 100 grams. These were subsequently milled on a two roll mill at 150° F for 8 minutes, during which time 0.50 parts of sulfur, either 1.00 part or 1.60 parts of the additive compound, and the accelerator system consisting of 3.00 parts Ethyl The sample was cured for 22 minutes at 316° F under a ram force of 23,000 pounds. After the 22 minutes curing time, the mold was removed from the press and the rubber sample containing both the support plates and wires was removed from the mold and allowed to cool to ambient temperature (72° F).

A description of the above sample preparation procedure is found in ASTM Test D2229-68.

c. Testing Method

After standing at ambient temperature for 18 to 24 hours, the wires were pulled from the rubber stock using an Instron Testing machine according to ASTM Test 2229-68, including the modifications described by A. E. Hicks et al. in *Rubber Chemistry and Technology*, 45, 26–48 (1972)

d. Test Results

The test results reported below were obtained according to the procedures described above. Pull-Out Force in the Table is the average force required to pull the wire from 0.5 inches of rubber. The blank value is the average force required to pull the wire from a formulation containing all of the ingredients except the additive compound. All formulations with the same stock designation number were prepared from the same rubber stock.

TABLE IV

Adhesion of Butyl Rubber to Brass Plated Steel Wire

| Additive Compound | Concentration phr | Stock Designation | Pull-Out Force (lbs./0.5 in.) |
|---|---|---|---|
| [structure: C=N-NH-C with OH, HO substituents] | 1.00 | 1 | 10.8 |

TABLE IV-continued

Adhesion of Butyl Rubber to Brass Plated Steel Wire

| Additive Compound | Concentration phr | Stock Designation | Pull-Out Force |
|---|---|---|---|
| 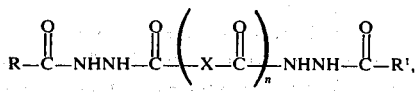 | 1.60 | 1 | 12.8 |
| Blank | | 1 | 6.6 |

What is claimed is:

1. A method of improving adhesion between a vulcanizable elastomeric composition and a metal surface to provide a strong and durable bond, which method comprises
i. adding to a vulcanizable elastomeric composition from 0.05 phr to 10 phr by weight based on the weight of the elastomer of an organic hydrazine derivative with metal deactivating efficiency selected from:
  a. a compound of the formula

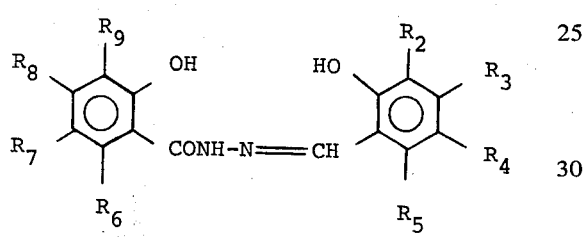

wherein $R_2, R_3, R_4, R_5, R_6, R_7, R_8$ and $R_9$ are each independently hydrogen, alkyl, alkoxy, or phenyl,
  b. a compound of the formula

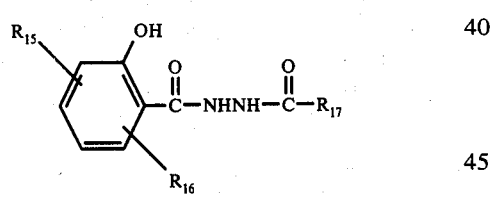

in which $R_{15}$ is hydrogen, alkyl with 1 to 8 carbon atoms, alkenyl with 3 or 4 carbon atoms cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms, $R_{16}$ is hydrogen, alkyl with 1 to 5 carbon atoms, alkenyl with 3 or 4 carbon atoms, cyclohexyl, aralkyl with 7 to 9 carbon atoms, chlorine or hydroxyl, $R_{17}$ is alkyl with 2 to 21 carbon atoms, cyclohexyl or the radical

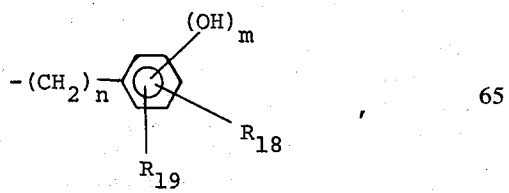

$m$ is 0 or 1 and $n$ is 0 to 2, the difference $n-m$ being not less than 0 when the OH group is in the o-position to the $-(CH_2)_n$ group, and wherein $R_{18}$ is hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms and $R_{19}$, when $m$ is 1, is hydrogen, alkyl with 1 to 5 carbon atoms, alkenyl with 3 to 4 carbon atoms, cyclohexyl, aralkyl with 7 to 9 carbon atoms, chlorine or hydroxyl, or $R_{19}$, when $m$ is 0, is hydrogen, alkyl with 1 to 8 carbon atoms, alkenyl with 3 to 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms,
  c. a compound of the formula

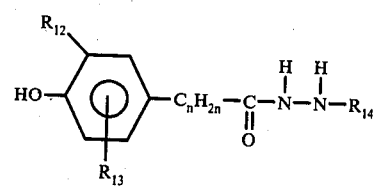

wherein $R_{12}$ is a lower alkyl group containing from 1 to 6 carbon atoms, $R_{13}$ is hydrogen or a lower alkyl group containing from 1 to 6 carbon atoms, and $R_{14}$ is hydrogen, an alkanoyl group containing 2 to 18 carbon atoms or a group represented by the formula

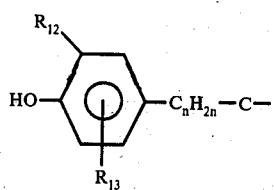

and $n$ is an integer from 0 to 5,
  d. a compound of the formula

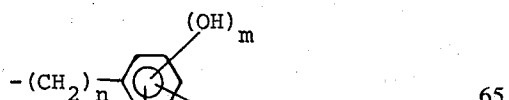

and wherein R and $R^1$ independently of each other are alkyl having from 1 to 17 carbon atoms, cyclohexyl, aralkyl, aralkyl substituted by one or two alkyl groups having each from 1 to 4 carbon atoms, and/or a hydroxyl group, phenyl, chlorophenyl, dichlorophenyl, phenyl, phenyl substituted by one or two alkyl groups having each from 1 to 4 carbon atoms and/or a hydroxyl group, alkylphenyl having from 7 to 14 carbon atoms, alkoxyphenyl having from 7 to 24 carbon atoms or naphthyl, X is the direct bond, an alkylene radical having from 2 to 8 carbon atoms, a phenylene radical or a naphthylene radical, and $n$ is 0 or 1, or e. a compound of the formula

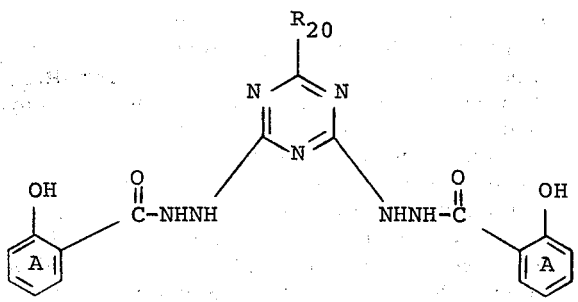

in which $R_{20}$ denotes hydrogen, alkyl with 1 to 8 carbon atoms, alkoxy with 1 to 18 carbon atoms, unsubstituted phenyl, phenyl substituted by lower alkyl groups, lower alkoxy groups, halogen and/or hydroxyl groups, the group

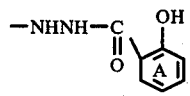

or the group

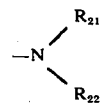

$R_{21}$ and $R_{22}$ independently of one another are hydrogen, alkyl with 1 to 18 carbon atoms, cyclohexyl, benzyl, unsubstituted phenyl or phenyl substituted by 1 or 2 alkyl groups each having 1 to 8 carbon atoms, or $R_{21}$ and $R_{22}$ conjointly, with inclusion of the nitrogen atom, are a saturated 5-membered to 7-membered heterocyclic ring, and the rings A are unsubstituted or are substituted by 1 or 2 alkyl groups having 1 to 18 carbon atoms, an alkoxy group having 1 to 18 carbon atoms and/or 1–3 chlorine atoms, and ii. vulcanizing the composition while it is in contact with the metal surface.

2. The method of claim 1 wherein the vulcanizable elastomer is selected from natural rubber, styrene-butadiene copolymer, ethylene-propylene terpolymer or butyl rubber containing at least 0.8% unsaturation.

3. The method of claim 1 wherein the vulcanizable elastomer is natural rubber, styrene-butadiene copolymer, ethylene-propylene terpolymer, or butyl rubber containing at least 0.8% unsaturation and the organic hydrazine derivative has the formula

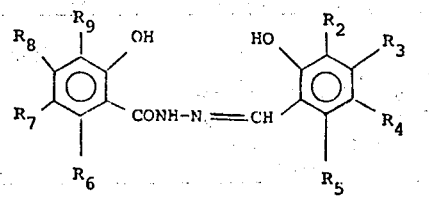

wherein $R_2$, $R_3$, $R_4$, $R_5$, $R_6$, $R_7$, $R_8$ and $R_9$ are each independently hydrogen, alkyl-, especially lower alkyl, e.g., methyl, ethyl, propyl, butyl, pentyl, hexyl-, alkoxy, especially lower-alkoxy, e.g., methoxy, ethoxy, propoxy, butoxy, pentoxy, hexoxy-, or a phenyl group.

4. The method of claim 3 wherein the organic hydrazine derivative is N-salicylidene-N'-salicylhydrazide.

5. The method of claim 1 wherein the organic hydrazine derivative is present in an amount of from 0.1 to 5.0 phr by weight, based on the weight of the elastomer.

6. The method of claim 1 wherein the vulcanizable elastomer is natural rubber and the organic hydrazine derivative has the formula

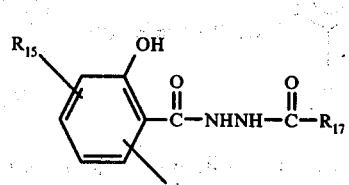

in which $R_{15}$ denotes hydrogen, alkyl with 1 to 8 carbon atoms, alkenyl with 3 or 4 carbon atoms cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms, $R_{16}$ denotes hydrogen, alkyl with 1 to 5 carbon atoms, alkenyl with 3 or 4 carbon atoms, cyclohexyl, aralkyl with 7 to 9 carbon atoms, chlorine or hydroxyl, $R_{17}$ denotes alkyl with 2 to 21 carbon atoms, cyclohexyl or the radical

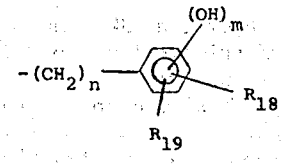

$m$ denotes 0 or 1 and $n$ denotes 0 to 2, the difference $n-m$ being not less than 0 if the OH group is in the o-position to the $-(CH_2)_n$ group, and wherein $R_{18}$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms and $R_{19}$, if $m$ is 1, denotes hydrogen, alkyl with 1 to 5 carbon atoms, alkenyl with 3 or 4 carbon atoms, cyclohexyl, aralkyl with 7 to 9 carbon atoms, chlorine or hydroxyl, or $R_{19}$, if $m$ is 0, denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms.

7. The method of claim 6 wherein the organic hydrazine derivative is N-salicyloyl-benzoic acid hydrazide, N,N'-disalicyloyl hydrazine, or 5-hexadecyloxysalicylic acid salicyl hydrazide.

8. The method of claim 1 wherein the vulcanizable elastomer is natural rubber and the organic hydrazine derivative has the formula

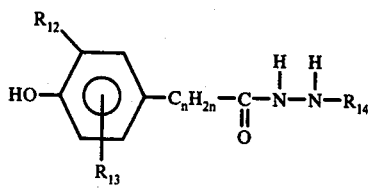

wherein $R_{12}$ is a lower alkyl group containing from 1 to 6 carbon atoms, $R_{13}$ is hydrogen or a lower alkyl group containing from 1 to 6 carbon atoms, and $R_{14}$ is hydrogen, an alkanoyl group containing 2 to 18 carbon atoms or a group represented by the formula

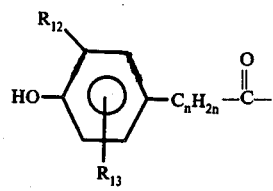

and $n$ is an integer from 0 to 5.

9. The method of claim 8 wherein the organic hydrazine derivative has the formula

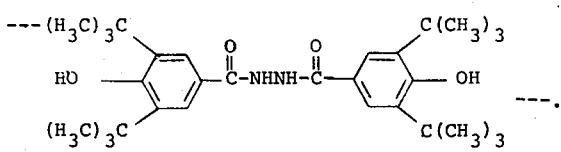

10. The method of claim 1 wherein the vulcanizable elastomer is natural rubber, styrene-butadiene copolymer, or ethylene-propylene terpolymer and the organic hydrazine derivative has the formula

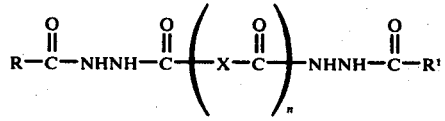

wherein R and $R^1$ independently of each other represent alkyl having from 1 to 17 carbon atoms, cyclohexyl, aralkyl which can be substituted by one or two alkyl groups having each from 1 to 4 carbon atoms, and/or a hydroxyl group, phenyl, chlorophenyl, dichlorophenyl, phenyl which can be substituted by one or two alkyl groups having each from 1 to 4 carbon atoms and/or a hydroxyl group, alkylphenyl having from 7 to 14 carbon atoms, alkoxyphenol having from 7 to 24 carbon atoms or naphthyl, X represents the direct bond, an alkylene radical having from 2 to 8 carbon atoms, a phenylene radical or a naphthylene radical, and $n$ represents 0 to 1.

11. The method of claim 10 wherein the organic hydrazine derivative has the formula

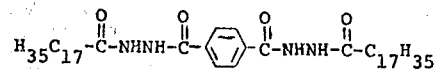

and the vulcanizable elastomer is styrene-butadiene copolymer or ethylene-propylene terpolymer.

12. The method of claim 10 wherein the organic hydrazine derivative has the formula

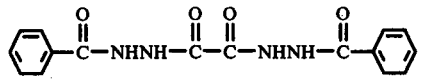

and the vulcanizable elastomer is natural rubber.

13. The method of claim 1 wherein the vulcanizable elastomer is natural rubber and the organic hydrazine derivative has the formula

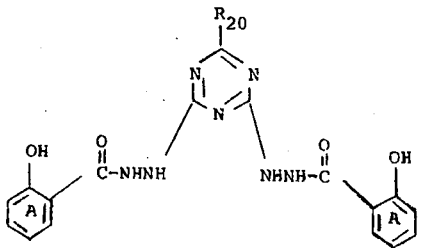

in which $R_{20}$ denotes hydrogen, alkyl with 1 to 8 carbon atoms, alkoxy with 1 to 18 carbon atoms, unsubstituted phenyl, phenyl substituted by lower alkyl groups, lower alkoxy groups, halogen and/or hydroxyl groups, the group

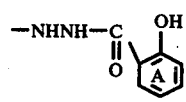

or the group

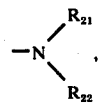

$R_{21}$ and $R_{22}$ independently of one another denote hydrogen, alkyl with 1 to 18 carbon atoms, cyclohexyl, benzyl, unsubstituted phenyl or phenyl substituted by 1 or 2 alkyl groups each having 1 to 8 carbon atoms, or $R_{21}$ and $R_{22}$ conjointly, with inclusion of the nitrogen atom, denote a saturated 5-membered to 7-membered heterocyclic ring, and the rings A are unsubstituted or are substituted by 1 or 2 alkyl groups each having 1 to 18 carbon atoms, an alkoxy group having 1 to 18 carbon atoms and/or 1–3 chlorine atoms.

14. The method of claim 13 wherein the organic hydrazine derivative has the formula

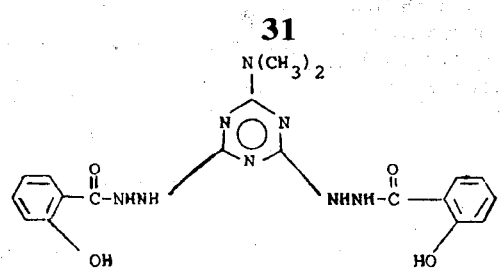
15. The method of claim 1 wherein the elastomeric composition contains carbon black.
16. The method of claim 1 wherein the vulcanizing agent is sulfur.
* * * * *